(12) United States Patent
Greenbaum

(10) Patent No.: US 7,853,198 B2
(45) Date of Patent: Dec. 14, 2010

(54) DELIVERING INDIVIDUALIZED CONTENT OVER A BROADCAST NETWORK

(75) Inventor: Gary S. Greenbaum, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 965 days.

(21) Appl. No.: 11/550,710

(22) Filed: Oct. 18, 2006

(65) Prior Publication Data

US 2008/0098442 A1 Apr. 24, 2008

(51) Int. Cl.
*H04H 60/09* (2008.01)
*H04H 20/71* (2008.01)

(52) U.S. Cl. .................. 455/3.04; 455/3.05; 455/3.06; 455/414.3; 455/418

(58) Field of Classification Search ................. None
See application file for complete search history.

(56) References Cited

U.S. PATENT DOCUMENTS

| | | | |
|---|---|---|---|
| 6,421,358 B1 | 7/2002 | Stimmel et al. | |
| 6,845,230 B2 * | 1/2005 | Syed | 455/3.02 |
| 7,015,972 B2 | 3/2006 | Thibon | |
| 7,062,779 B1 | 6/2006 | Courtney et al. | |
| 2002/0173273 A1 | 11/2002 | Spurgat et al. | |
| 2004/0082343 A1 | 4/2004 | Kim et al. | |
| 2004/0237120 A1 | 11/2004 | Lewin et al. | |
| 2005/0058090 A1 | 3/2005 | Chang et al. | |
| 2005/0166257 A1 | 7/2005 | Feinleib et al. | |
| 2006/0069769 A1 | 3/2006 | Dacosta | |
| 2008/0160910 A1 * | 7/2008 | Khedouri et al. | 455/3.06 |

FOREIGN PATENT DOCUMENTS

| | | |
|---|---|---|
| KR | WO2005031593 A1 | 4/2005 |
| WO | 2005045603 A2 | 5/2005 |

OTHER PUBLICATIONS

Holden et al., "A Spread-Spectrum Based Sychronization Technique For Digital Broadcast Systems", IEEE Transactions on Broadcasting vol. 34, No. 3, Sep. 1990, pp. 185-194.
Boukerche et al., "Media Synchronization and QoS Packet Scheduling Algorithms for Wireless Systems", Mobile Networks and Applications, vol. 10, Nos. 1-2, Feb. 2005, pp. 233-249.
Coatta et al., "A Data Synchronization Service for Ad Hoc Groups", Wireless Communications and Networking Conference, 2004, WCNC, 2004 IEEE, vol. 1, Mar. 21, 2004, pp. 483-488.
Furht et al., "Multimedia Broadcasting over the Internet: Part I", Project Reports, IEEE Multimedia, vol. 5, No. 4, Oct.-Dec. 1998, pp. 78-82, doi:10.1109/93.735871.

* cited by examiner

*Primary Examiner*—Philip J Sobutka
(74) *Attorney, Agent, or Firm*—Lee & Hayes, PLLC

(57) ABSTRACT

In various embodiments, a unidirectional broadcast network is utilized to provide digital content to users in a manner that allows users' computing devices to maintain synchrony with personal, relevant information. In at least some embodiments, the broadcast network utilizes a data channel and a signaling channel. The data channel is used for broadcasting data to various users, while the signaling channel—typically used for transmitting device or machine specific data—is used to transmit user-specific information associated with the information or data that the user finds relevant. This user-specific information can then be used by the user's mobile computing device to manage, e.g. record and place into device database for time shifted retrieval, such information or digital objects delivered over the broadcast data channel.

20 Claims, 4 Drawing Sheets

DELIVERING INDIVIDUALIZED CONTENT OVER A BROADCAST NETWORK

BACKGROUND

As communications networks evolve and become more sophisticated, users are able to manage and access information of interest to them in novel ways. For example, a third party service provider may offer up subscriptions through which users can subscribe and receive digital objects for consumption. Such digital objects can include such things as digital music, video, news, documents and the like.

Many users today, however, find themselves on the move with their mobile computing devices. Such mobile scenarios pose challenges for (1) keeping a user's device synchronized with remote data that the user finds interesting or (2) otherwise enabling a user to access and consume information that is interesting to them. For example, leveraging today's uplink/downlink cellular network can provide effective global connectivity coverage, but due to electromagnetic spectrum constraints that limit data throughput, these networks are unlikely to provide a scalable solution for maintaining device synchrony for all users.

SUMMARY

In various embodiments, a "Broadcast network", i.e. a unidirectional "one to many network" is utilized to provide digital content, also termed "digital objects", to users. In at least some embodiments, this is done in a manner that allows users' computing devices to maintain synchrony with information that is personally relevant to them. In at least some embodiments, the broadcast network utilizes a data channel and a signaling channel. The data channel is used for broadcasting data to all receiver units, while the signaling channel—typically used for transmitting device or machine specific data—is used to transmit user-specific information associated with the information or data that the user finds relevant.

In at least some embodiments, the user can specify to the broadcast service provider through some other "back-channel" network link, e.g. home internet, what information or content he/she deems relevant to synchronize on their mobile device. If a signaling channel is available, the signaling channel can then signal to the device when and where the content can be retrieved. This user-specific information can then be used by the user's mobile computing device to manage, e.g. to record into a local database for time-shifted consumption, such information when the digital objects are broadcast by the broadcast network.

DETAILED DESCRIPTION

Overview

In various embodiments, a broadcast network is utilized to provide digital content, also termed "digital objects" to users in a manner that allows users' computing devices to maintain synchrony with personally relevant information. The synchronization efforts can, for example, enable a user to maintain synchrony between one or more personal computing devices and a remote library that describes or references that user's relevant information. In at least some embodiments, the broadcast network utilizes a data channel and a signaling channel.

The data channel is used for broadcasting data to all receiver units, while the signaling channel—typically used for transmitting device or machine specific data such as supplying the content decryption keys for protected media content or hardware/firmware updates—is used to transmit user-specific information associated with the information or data that the user finds personally relevant. This user-specific information can then be used by the user's computing device, such as a mobile computing device, to take an action relative to one or more digital objects, such as record such digital objects when the digital objects are broadcast by the broadcast network, generate alerts or take other actions as appropriate for a given digital object.

The digital objects that are the subject of the synchronization efforts can comprise any suitable type of digital object that users may find personally relevant. Such digital objects can include, by way of example and not limitation, digital music, video, pictures, documents, blogs, sporting event alerts, news items and the like. In the examples that are used throughout this document, digital objects in the form of digital music (files or streams) are used. It is to be appreciated and understood that such exemplary digital objects are not intended to limit application of the claimed subject matter to these objects. Rather, other objects (such as those mentioned above and others) can be utilized without departing from the spirit and scope of the claimed subject matter.

Exemplary System Overview

Figure 1:
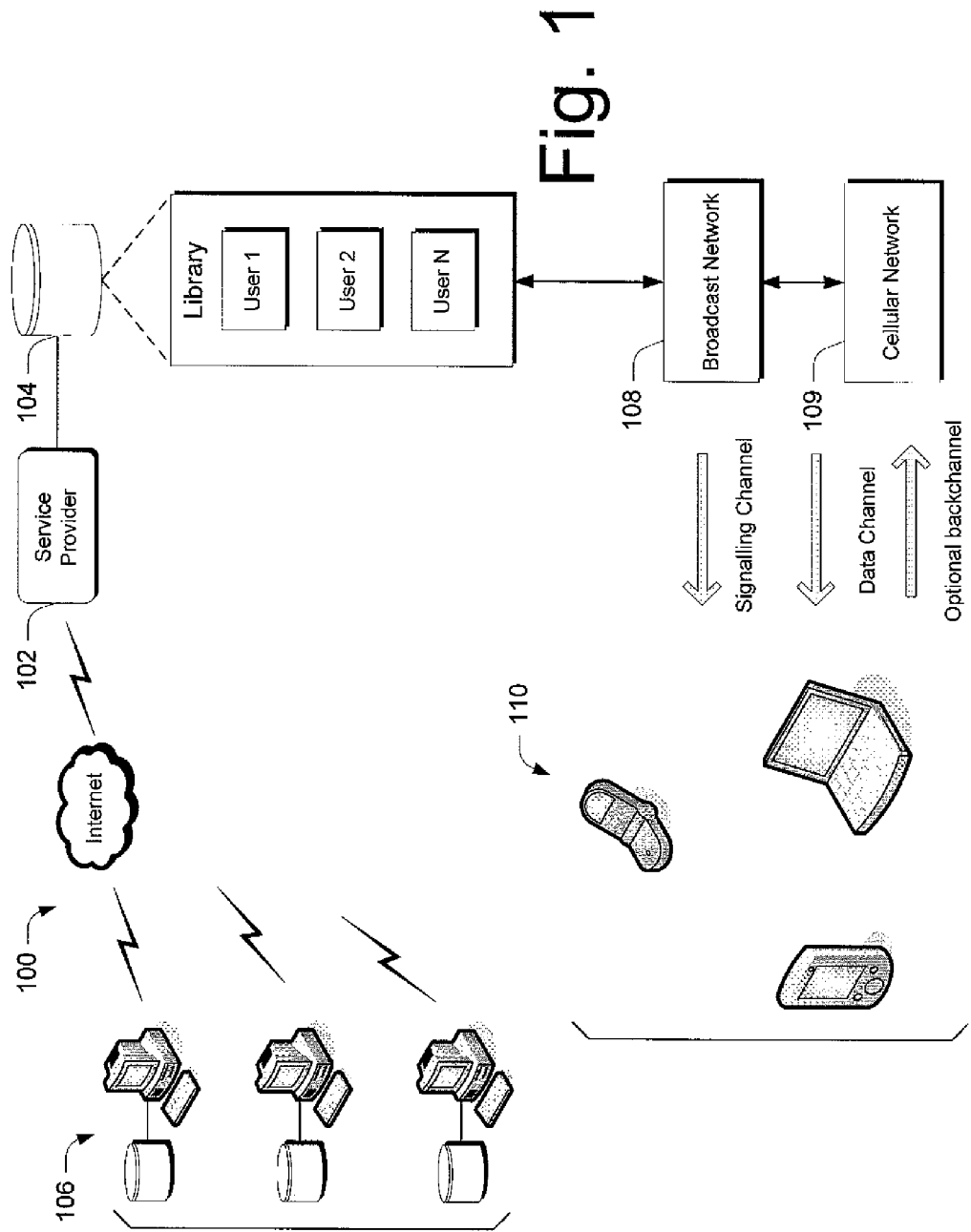
FIG. 1 illustrates an exemplary system in accordance with one embodiment.

FIG. 1 illustrates an exemplary system in accordance with one embodiment generally at 100. System 100 includes, in this example, a service provider 102 that maintains a store 104 that includes various user information. In this particular example, service provider 102 might offer up subscriptions for various users and maintain subscription information in the store 104. The subscription information can be maintained in a library and can include user information such as user names, billing information and a list of digital objects of interest to the users. Such digital objects might include, for example, a list of objects such as songs to which the user has subscribed or one's latest email.

In addition, system 100 includes a plurality of computing devices shown generally at 106. These computing devices can be considered as generally, though not exclusively, non-mobile devices. For example, these devices might be desktop computing devices that generally stay in one location or, alternately, mobile devices such as the ones shown generally at 110. These devices are communicatively linked with service provider 102 via a suitable network such as the Internet.

In addition, system 100 includes a broadcast network 108 that is configured to (unidirectionally) broadcast content to many users or subscribers. Any suitable broadcast network can be utilized. In at least some embodiments, there is no back-channel communications from the device to the service provider or broadcast network operator. In the absence of a back channel whereby confirmation of delivery can be sent to the network provider, the network provider typically repeats delivery to increase the likelihood of receipt by the user device which often is battery powered and turned-off when not in use. In the worst case of a complete mismatch in time of device activation and broadcast delivery of the digital object, the device itself knows via the signaling channel that a specific media object has not been delivered within a specific time window and can inform the user to seek alternative means of securing this download or to leave his device on at certain time.

Optionally, a cellular network 109 can be provided that includes an optional back channel through which a user can communicate with the broadcast network. One benefit of this configuration is delivery confirmation which the network provider can use to improve its delivery scheduling efficiency.

One example of a broadcast network is a so-called conditional access network in which the user is conditionally granted access to the network responsive to some type of agreement with the network provider (which can be service provider 102 or some other entity). Such an agreement might take the form of a subscription. Contemporary examples of conditional access networks include, by way of example and not limitation, Direct-TV, XM radio, Sirius radio, upcoming DVB-H networks and the like.

System 100 also includes multiple different mobile computing devices—here shown generally at 110. In this example, the mobile computing devices include, by way of example and not limitation, cell phones, personal digital assistants and laptop computing devices to name just a few. Other computing devices including those not designed for mobility can be utilized without departing from the spirit and scope of the claimed subject matter.

In practice, service provider 102 can offer up subscriptions or otherwise make it possible for various users to acquire rights in digital objects. For example, in the case where the digital objects comprise digital music, the service provider can allow users to register and pay for downloading various songs. This can be done via one of the computing devices shown generally at 106. As noted above, the service provider then maintains a library of information that includes the objects to which the user has subscribed.

In practice, the broadcast network operator is often the same entity as the service provider operator.

To maintain synchrony between a user's mobile computing device and the library maintained by the service provider, the broadcast network broadcasts, to the computing devices, information that enables the computing devices to receive or otherwise record, alert, or playback a digital object as appropriately designated by the digital object when it is broadcast by the broadcast network 108. This information is conveyed, in this embodiment, using a signaling channel associated with the broadcast network. Specifically, in this embodiment, data (such as the digital objects) are broadcast using a data channel. Other information, such as the transmission of content decryption keys, updates, rights, time expiration, delivery window, and other user-specific information that includes digital object synchronization information, is broadcast using the signaling channel. Specific examples of the types of synchronization information and how each can be used are provided below in a section entitled "Implementation Example".

Implementation Example

Figure 2:
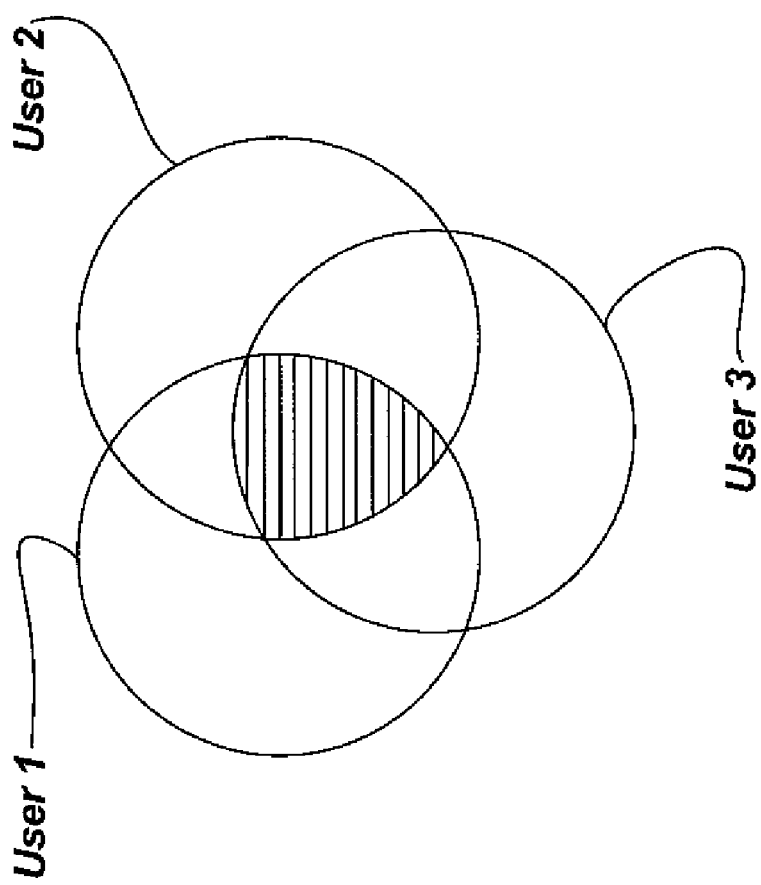
FIG. 2 illustrates, on a very small scale, the notion of overlapping interests between users.

Consider now one particular implementation of the above-described system. FIG. 2 illustrates, on a very small scale, the notion of overlapping interests between users.

Specifically, consider that there are three users who have subscribed, through the service provider, to receive digital objects. The collection of each user's digital objects is graphically represented by an individual circle. Thus, user 1's digital object collection is represented by the indicated circle, and so on. Notice in this example that, as amongst users, there is some overlap in their interest (indicated by the hatched area). Specifically, the collection of users has digital objects in which they are commonly interested. In the scenario in which the digital objects comprise music, the music that falls into the overlapping region might be the most popular songs at the time for a particular class of users.

In this particular example, the service provider or broadcast network can base their delivery schedule of particular digital objects based on a "majority rule" policy among its users. The more demanded a particular object, the higher priority for broadcast and rebroadcast. With a statistically based delivery methodology, the broadcaster of the objects can utilize the signaling channel to notify individual user mobile computing devices when digital objects relevant to the user are going to be broadcast. Once the mobile computing device understands when a particular digital object is going to be broadcast (and rebroadcast), it can arrange to record the digital object for its user.

In this manner, a user's collection of digital objects on their mobile computing device can be kept synchronized with a library that reflects the objects in which the user is interested.

Consider now one example of synchronization and what types of synchronization information can be sent using the exemplary signaling channel. In at least some embodiments, synchronization pertains to or is influenced by different activities that can occur on the mobile computing device, and/or activities that are determined by the service provider. Responsive to these different types of activities, different types of information can be sent.

A first activity is an add activity in which a digital object is added to the mobile computing device. This can occur at a couple of different times. The first time that an object can be added is when the device is initially synchronized. The second time that an object can be added is when a user has added a digital object that is not currently present to their collection. In the add scenario, the broadcast network uses the signaling channel to send synchronization information to the device that indicates when to record a particular digital object. In at least some embodiments this synchronization information includes a start recording time, a record duration time, an "activity" tag (e.g. pertaining to an add, delete, notify, etc. activity), rebroadcast times, and a broadcast channel or frequency number. Optionally, a content ID of the digital object can be sent in the signaling channel as well. This optional information can be useful in notifying the user of non-delivery of a specific content item during its rebroadcast schedule. In at least some embodiments, the content ID is sent in the data channel when the digital object is broadcast. Thus, by knowing when to start and stop recording on a particular channel, the mobile computing device can capture the digital object when it is broadcast.

A second activity is a delete activity in which a user or the service provider deletes the digital object. This can occur when, for example, a user pares their library or their rights have expired. In this instance, the synchronization data includes the content ID of the digital object being deleted.

A third activity is a null or not sent activity in which the particular digital object of interest to the user is not scheduled for broadcast. This informs the user that they must obtain the object by other means. In this case, the content ID of the digital object that is the subject of the null activity can be sent. In this case, the user would have to find alternative means to include the object on their mobile computing device.

In at least some embodiments, the signaling channel can be used to send the actual digital objects to individual users. For example, consider the case in which a user has a digital object in their library that is an obscure song that is not likely to be requested frequently. In this case, the signaling channel can be used to send the actual digital object to the user's mobile computing device.

It is to be appreciated and understood that any suitable signaling channel can be used to implement the above-described methodology. Characteristics or properties of such signaling channels can include, by way of example and not limitation, that the channel is typically used to send machine-specific or machine-associated data. Additionally, at least some of such channels are typically not a primary data channel that sends data for consumption by individual users. Rather, the data that is sent is typically consumed by the individual device—such as content protection keys or updates.

One specific non-limiting example of a signaling channel is that which can be used to send so-called Entitlement Management Messages (EMMs) to address individual devices with messages, commands and service keys. EMMs do not typically have to be transmitted in a synchronous manner with a media payload, but rather are transmitted in advance in order to give access to an authorized subscriber. To be sure that an EMM is received by the user to renew a subscription, the message is typically repeated sufficiently often. EMMs are therefore organized in cycles for broadcasting.

Exemplary Method

Figure 3:
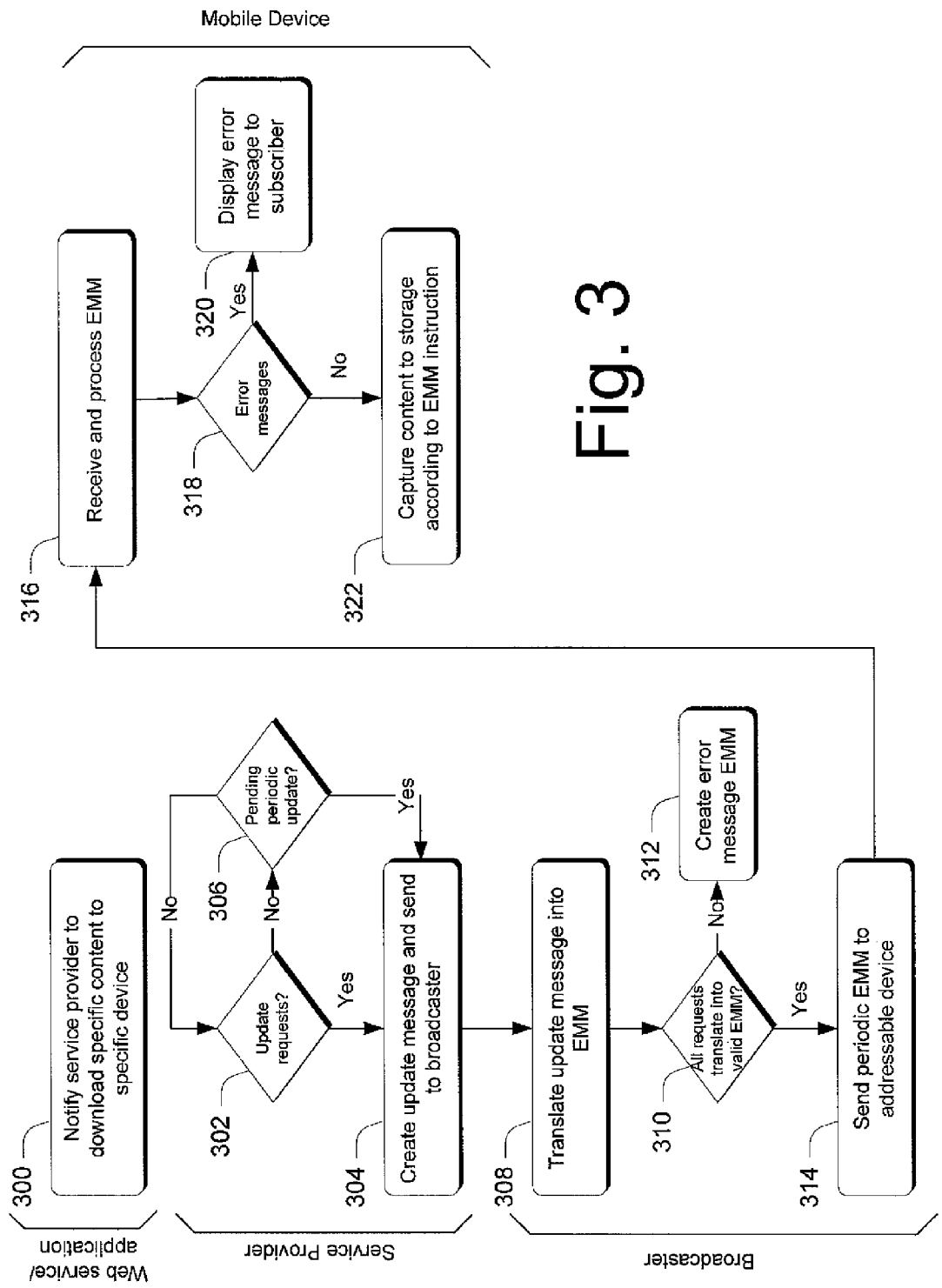
FIG. 3 is a flow diagram that describes steps in a method in accordance with one embodiment.

FIG. 3 is a flow diagram that describes steps in a method in accordance with one embodiment. The method can be implemented in connection with any suitable hardware, software, firmware or combination thereof. In at least some embodiments, the method is implemented in software. In addition, in the depicted flow diagram, various acts or steps are shown as being performed by different entities such as, for example, a web service/application, a service provider, a broadcaster or broadcast network (which may or may not be the service provider), and a mobile device.

Step 300 notifies a service provider to download specific content to a specific device. This step can be accomplished by a user via a suitable web service or application or, in certain circumstances, e.g. sport news alerts, can be accomplished by the service provider itself. In at least some embodiments the content resides in the form of one or more digital objects such as those mentioned above. This step can be performed when, for example, a user initially acquires rights in a digital object.

Step 302 ascertains whether there are any update requests. This step can be accomplished by a suitably configured service provider responsive to input that indicates that there is an update request. In at least some embodiments, update requests can be generated as a result of different entities. For example, the user may acquire rights in and consequently receive one or more new or additional digital objects on their non-mobile computing device. In this case, an update message would be created and sent to a broadcaster (step 304). Alternately or additionally, the user's rights in a particular digital object may expire or otherwise change. In this case, an update message would be created and sent to the broadcaster (step 304).

If, on the other hand, an update request is not received, step 306 ascertains whether there are any pending periodic updates. If not, the method loops back to step 302. If there are pending periodic updates, the method branches to step 304 to create and send an update message to the broadcaster.

Step 308 receives and translates the update request into a message that can be sent to mobile devices via a signaling channel. In the illustrated and described embodiment, this message is an EMM message. It is to be appreciated and understood that other messages using other signaling channels can be used without departing from the spirit and scope of the claimed subject matter. In the illustrated example this step is performed by a broadcaster. The broadcaster may or may not be the same entity as the service provider. It is to be appreciated and understood that in the absence of a signaling channel on the broadcast network, the method would skip to step 322 whereby the mobile device has been user programmed to capture predetermined content.

Step 310 ascertains whether all of the requests have been translated into a valid EMM. If not, step 312 creates an error message EMM. If all (or any) of the requests have been translated into valid EMMs, step 314 sends periodic EMMs to the addressable mobile computing device. In at least some embodiments, delivery is based on the collective statistics of demand by the overall user base of the network operator. Additionally, to assure receipt, delivery of the digital object over the data channel and the EMM over the signaling channel will be frequently rebroadcast.

Step 316 receives and processes the EMM. This step is performed by the mobile computing device. Here, the mobile computing device receives the EMM via the signaling channel. Step 318 determines whether there are any error messages in the EMM. If there are, step 320 displays the error message for the subscriber or user. If the EMM contains no error messages and/or there is content described in the EMM, step 322 captures the content—here, the digital objects—according to the instructions contained in the EMM. Recall from the discussion above that the message that is received that enables the content to be captured can contain synchronization information such as a start and stop recording time, subsequent rebroadcast time, as well as a channel number corresponding to the channel over which the digital object is to be broadcast. Additionally, the EMM itself could contain the digital object. In such case, the mobile device extracts the message data from the digital object.

By using a signaling channel, such as an EMM channel, an out of band mechanism is provided, independent of a data channel, that can be used to synchronize a user's mobile computing device such that their computing device remains up-to-date with a library that references particular digital objects in which the user has an interest.

Exemplary Mobile Computing Device

Figure 4:
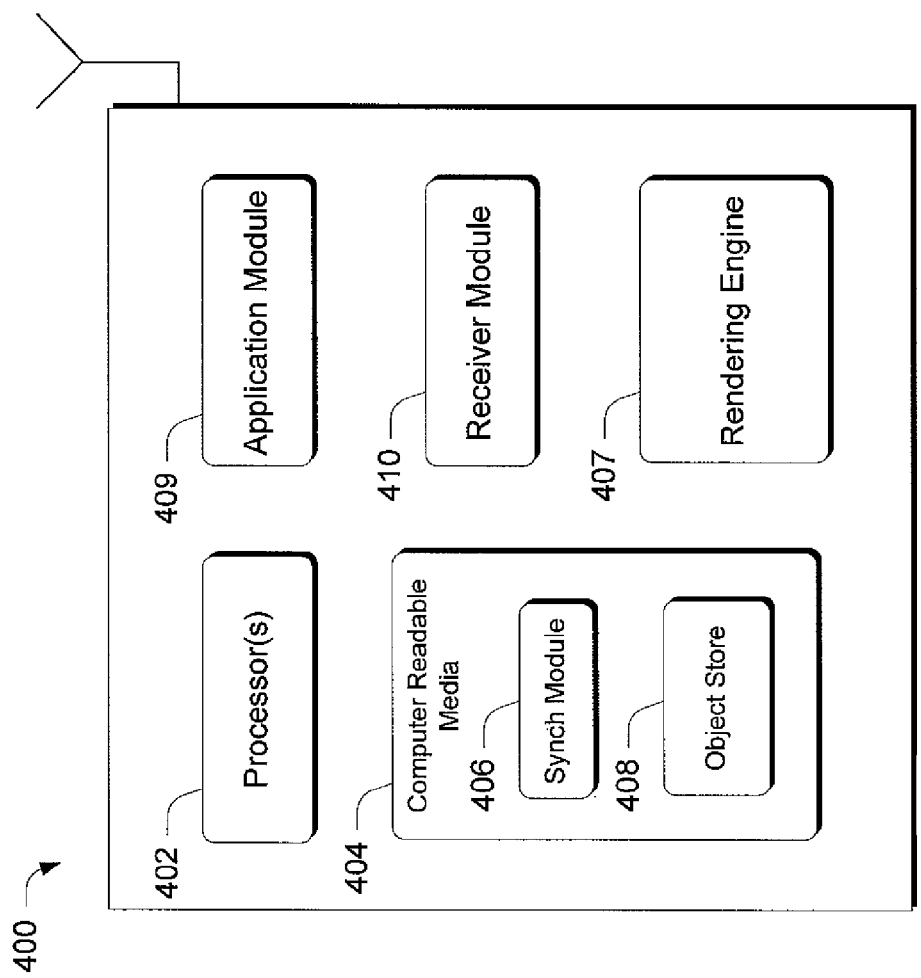
FIG. 4 illustrates an exemplary mobile computing device in accordance with one embodiment.

FIG. 4 illustrates an exemplary mobile computing device that can be used to implement one or more of the embodiments described above, generally at 400. In this particular example, mobile computing device 400 includes one or more processors 402 and one or more computer-readable media 404. Here, the computer-readable media includes computer-readable instructions in the form of software that is executable by processor(s) 402 to implement the functionality described above. Specifically, in this example, computer-readable media includes a synchronization module 406 that is programmed to implement the functionality described above. In addition, the computer-readable media includes an object store 408 in which various digital objects can be stored. In addition, device 400 includes a rendering engine module 407 that is configured to render the digital objects. All user components, in this example, are orchestrated by an application module 409, which also is responsible for compliance with the rights and restrictions associated with the digital object.

Further, device 400 includes a receiver module 410 that is configured to receive transmissions over both data and signaling channels. In this case, the transmissions that are received over the signaling channel can include synchronization information such as that described above.

In at least some embodiments, as noted above, the digital objects can take the form of digital music. Having now described some basic principles of operation, consider now an exemplary use scenario.

Exemplary Use Scenario

Consider that Bob wishes to synchronize his in-dash satellite radio unit with his Internet music subscription service. In this case, by leveraging his satellite radio's conditional access signaling channel, the music that Bob has purchased or subscribed to through this service can be automatically downloaded to his car head end unit as described above. As a result, Bob can now access all of his music. The same methodology can also be applied to Bob's email, pictures, address book, word documents and the like.

Payment Model

In at least some embodiments, a payment model can be utilized to accommodate royalty payments that are to be made relative to digital objects, e.g. digital music that are consumed by end users. In the context in which digital objects comprise songs, consider the following. This is particularly useful in the event no metering data is available to indicate playcount.

For a given market such as the commuting market in which the user's mobile computing device comprises their in-dash unit, one can access the average commute time $<T$ (min)$>$ and the average listening time as a percentage of the commute time $<p$ (%)$>$. Other assumptions in this model are: n minutes per song, and x copyright remuneration per song. In this model, the service provider can be responsible for daily payment to ASCAP of:

$$\text{Payment/day/subscriber} = \$(<p>*<T\min>/n)*x.$$

As an example, assume that $<T>=25$ minutes$\times 2$ round trips, p=80%, n=3 minutes, and x=$0.0007. Using these figures, monthly payments to ASCAP to cover copyright royalties would be $0.23.

Extensions

In at least some embodiments, the use of a signaling channel, as described above, can be extended as follows.

Often there are different user-associated or user-specific rights associated with digital objects, such as digital music, that constitute an agreement between a user and a particular service provider. These rights can include whether or not a user can transfer the digital object, how many times the user can consume the digital object, the resolution at which the digital object is to be consumed and the like. In these embodiments, the signaling channel can be used to convey or otherwise express these rights to the user's mobile computing device.

Alternately or additionally, the notion of synchronization can be applied to not only a user's personal library, but to synchronization with someone else's or some other entities remote library. For example, this might be the case in the context of digital objects that are shared amongst users or provided by various entities, e.g. music, blogs, blogs of groups to which the user belongs, syndication feeds such as RSS feeds and the like.

Additionally, the notion of synchronization can be extended to include synchronization of digital objects from a service provider's collection of objects, e.g. a remote library, based on a user's a priori selection. As an example, this might be daily news headlines or intra-day sporting alerts, such as would be provided through, for example, a syndication feed.

CONCLUSION

In various embodiments, a unidirectional broadcast network is utilized to provide digital content to users in a manner that allows users' computing devices to maintain synchrony with information that is relevant to the users. In at least some embodiments, the broadcast network utilizes a data channel and a signaling channel. The data channel is used for broadcasting data to various users, while the signaling channel—typically used for transmitting device or machine specific data—is used to transmit user-specific information associated with the information or data that the user finds interesting. This user-specific information can then be used by the user's mobile computing device to record such information or digital objects.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:

using a signaling channel associated with a broadcast network to transmit user-specific information to a computing device, wherein the user-specific information is configured to be used by the computing device to take an action pertaining to one or more digital objects when the digital objects are broadcast or rebroadcast by the broadcast network; and using a data channel associated with the broadcast network to broadcast one or more digital objects, wherein broadcast of said one or more digital objects is determined by digital objects in which multiple users have expressed a common interest.

2. The method of claim 1, wherein at least some of the digital objects comprise digital music.

3. The method of claim 1, wherein the system embodiment that implements the method does not include a back channel that can communicate with the broadcast network.

4. The method of claim 1, wherein the broadcast network comprises a conditional access broadcast network.

5. The method of claim 1, wherein the user-specific information is ascertained from a library of information that includes a specification of digital objects to which a user has subscribed.

6. The method of claim 1, wherein the user-specific information comprises synchronization information that can include a start recording time, duration recording time, rebroadcast times, action tag, rights associated with digital object, a channel (frequency) number or a content ID associated with a digital object.

7. The method of claim 1 further comprising using the signaling channel to convey rights and restrictions associated with digital objects to the computing device.

8. The method of claim 1, wherein the act of using the data channel comprises using a statistical method to determine delivery priority of the one or more digital objects.

9. The method of claim 1, wherein the user-specific information comprises synchronization information that can include an indication that a digital object is not scheduled for broadcast.

10. The method of claim 1 further comprising using a payment model to accommodate royalty payments that are to be made relative to broadcasting digital objects whereby no metering data indicating playcount is available.

11. The method of claim 1, wherein the signaling channel comprises one that can be used to send Entitlement Management Messages (EMMs).

12. A computer-implemented method comprising:
receiving, via a mobile computing device, synchronization information that can be used to synchronize a user's digital object collection on the mobile computing device with a remote library, wherein said synchronization information is received via a signaling channel different from a data channel that transmits digital objects; and
using the synchronization information to capture digital objects when the digital objects are broadcast by a broadcast network.

13. The method of claim 12, wherein the act of receiving is performed by receiving the synchronization information as an Entitlement Management Message.

14. The method of claim 12, wherein at least some of the digital objects comprise digital music.

15. The method of claim 12, wherein the act of receiving is performed by receiving the synchronization information from a broadcast network that also broadcasts the digital objects.

16. The method of claim 12, wherein the synchronization information can include a start recording time, duration recording time, rebroadcast times, action tag, rights associated with digital object, an indication that a digital object is not scheduled for broadcast or a channel (frequency) number.

17. The method of claim 12, wherein the synchronization information can include a content ID associated with a digital object.

18. A mobile computing device comprising:
one or more processors;
one or more memories storing instructions that, when executed by the one or more processors, cause the one or more processors to implement a method comprising:
receiving synchronization information that can be used to synchronize a user's digital object collection on the mobile computing device with a remote library, wherein said synchronization information is received via a signaling channel different from a data channel that transmits digital objects; and
using the synchronization information to capture digital objects when the digital objects are broadcast by a broadcast network.

19. The mobile computing device of claim 18, wherein the act of receiving is performed by receiving the synchronization information as an Entitlement Management Message.

20. The mobile computing device of claim 18, wherein the synchronization information can include:
a start recording time;
a duration recording time;
an action tag;
a channel (frequency) number;
rebroadcast times;
a content ID associated with a digital object; and
an indication that a digital object is not scheduled for broadcast.

* * * * *